(12) United States Patent
Tan et al.

(10) Patent No.: US 11,132,801 B2
(45) Date of Patent: Sep. 28, 2021

(54) SEGMENTATION OF THREE-DIMENSIONAL IMAGES CONTAINING ANATOMIC STRUCTURES

(71) Applicant: CENTERLINE BIOMEDICAL, INC., Cleveland, OH (US)

(72) Inventors: Yiyong Tan, Hopkinton, MA (US); Richard C. Frank, Newtonville, MA (US)

(73) Assignee: CENTERLINE BIOMEDICAL, INC., Cleveland, OH (US)

( * ) Notice: Subject to any disclaimer, the term of this patent is extended or adjusted under 35 U.S.C. 154(b) by 237 days.

(21) Appl. No.: 16/265,732

(22) Filed: Feb. 1, 2019

(65) Prior Publication Data
US 2019/0244363 A1    Aug. 8, 2019

Related U.S. Application Data

(60) Provisional application No. 62/625,382, filed on Feb. 2, 2018, provisional application No. 62/625,377, filed on Feb. 2, 2018.

(51) Int. Cl.
*G06T 7/187* (2017.01)
*G06T 7/11* (2017.01)
(Continued)

(52) U.S. Cl.
CPC .............. *G06T 7/187* (2017.01); *G06T 5/002* (2013.01); *G06T 7/0012* (2013.01); *G06T 7/11* (2017.01);
(Continued)

(58) Field of Classification Search
None
See application file for complete search history.

(56) References Cited

U.S. PATENT DOCUMENTS 6,501,848 B1    12/2002    Carroll et al.
6,533,455 B2    3/2003    Graumann et al.
(Continued)

FOREIGN PATENT DOCUMENTS

EP    1421913 A1    5/2004
EP    0954830 B1    3/2006
(Continued)

OTHER PUBLICATIONS

Applicant: CardioInsight Technologies, Inc.; International Search Report and Written Opinion; International Application No. PCT/US2019/016367; Filed Feb. 1, 2019; Authorized Officer: Yeonkyung Kim; dated May 17, 2019; 8 pgs.
(Continued)

*Primary Examiner* — Tahmina N Ansari
(74) *Attorney, Agent, or Firm* — Tarolli, Sundheim, Covell & Tummino LLP

(57) ABSTRACT

In an example, a method includes selecting a user-selected seed voxel from a medical image. The user-selected seed voxel is shifted to an adjusted seed voxel in an evaluation region based on an evaluation. The evaluation region includes the user-selected seed voxel and at least one other voxel within a predetermined spatial distance. A given region in the image volume is filled with voxels to provide a segmented volume for the given region based on the adjusted seed voxel and segmentation filter parameters. A segmentation region is evaluated to ascertain a quality of the fill. Seed candidates may be determined from a set of the filled voxels adjacent a boundary of the for another region given region in response to determining that the quality of the fill indicates a valid segmentation for the anatomic vessel structure in the given region. Segmented vessel image data is stored.

26 Claims, 10 Drawing Sheets

(51) Int. Cl.
*G06T 7/00* (2017.01)
*G06T 15/08* (2011.01)
*G06T 7/136* (2017.01)
*G06T 17/00* (2006.01)
*G06T 5/00* (2006.01)

(52) U.S. Cl.
CPC .............. *G06T 7/136* (2017.01); *G06T 15/08* (2013.01); *G06T 17/00* (2013.01); *G06T 2207/10081* (2013.01); *G06T 2207/20101* (2013.01); *G06T 2207/20156* (2013.01); *G06T 2207/30008* (2013.01); *G06T 2207/30101* (2013.01); *G06T 2207/30172* (2013.01)

(56) References Cited

U.S. PATENT DOCUMENTS

| | | |
|---|---|---|
| 6,728,566 B1 | 4/2004 | Subramanyan et al. |
| 6,782,284 B1 | 8/2004 | Subramanyan et al. |
| 7,010,095 B2 | 3/2006 | Mitschke et al. |
| 7,149,333 B2 | 12/2006 | Pieper et al. |
| 7,545,979 B2 | 6/2009 | Fidrich et al. |
| 7,556,428 B2 | 7/2009 | Sukovic et al. |
| 7,671,887 B2 | 3/2010 | Pescatore et al. |
| 7,824,328 B2 | 11/2010 | Gattani et al. |
| 7,940,974 B2 * | 5/2011 | Skinner ................ G06T 7/12 382/131 |
| 7,990,379 B2 | 8/2011 | Aharon et al. |
| 8,060,185 B2 | 11/2011 | Hunter et al. |
| 8,213,693 B1 | 7/2012 | Li |
| 8,219,179 B2 | 7/2012 | Ganatra et al. |
| 8,224,632 B2 | 7/2012 | Whirley et al. |
| 8,238,625 B2 | 8/2012 | Strommer et al. |
| 8,248,413 B2 | 8/2012 | Gattani et al. |
| 8,301,226 B2 | 10/2012 | Csavoy et al. |
| 8,315,355 B2 | 11/2012 | Mohamed |
| 8,467,853 B2 | 6/2013 | Hunter et al. |
| 9,286,505 B2 | 3/2016 | Ajemba et al. |
| 9,424,644 B2 | 8/2016 | Sprencz et al. |
| 10,007,985 B2 | 6/2018 | Leon et al. |
| 10,037,603 B2 | 7/2018 | Lay et al. |
| 2003/0011624 A1 | 1/2003 | Ellis |
| 2003/0056799 A1 | 3/2003 | Young |
| 2005/0152588 A1 | 7/2005 | Yoshida et al. |
| 2006/0036167 A1 | 2/2006 | Shina |
| 2006/0251300 A1 | 11/2006 | Borgert et al. |
| 2006/0280351 A1 | 12/2006 | Luping et al. |
| 2007/0116342 A1 | 5/2007 | Zarkh |
| 2007/0248250 A1 | 10/2007 | Gulsun |
| 2008/0018646 A1 | 1/2008 | Farag |
| 2008/0020362 A1 | 1/2008 | Cotin et al. |
| 2008/0132774 A1 | 6/2008 | Milstein |
| 2009/0122060 A1 * | 5/2009 | Porat .................. G06T 7/11 345/424 |
| 2009/0227861 A1 | 9/2009 | Ganatra et al. |
| 2009/0279758 A1 | 11/2009 | Dikici |
| 2009/0304245 A1 * | 12/2009 | Egger .................. G06T 7/12 382/128 |
| 2010/0210938 A1 | 8/2010 | Verard |
| 2010/0312094 A1 | 12/2010 | Guttman et al. |
| 2011/0054300 A1 | 3/2011 | Yamamoto et al. |
| 2011/0166446 A1 | 7/2011 | Whitmore, III et al. |
| 2011/0295109 A1 | 12/2011 | Lavellee et al. |
| 2013/0079628 A1 | 3/2013 | Groszmann |
| 2019/0244363 A1 * | 8/2019 | Tan .................. G06T 15/08 |

FOREIGN PATENT DOCUMENTS

| | | |
|---|---|---|
| JP | 2007185278 A | 7/2007 |
| JP | 2008061858 A | 3/2008 |
| JP | 2008136850 A | 6/2008 |
| JP | 2009072317 A | 4/2009 |
| JP | 2012529352 A | 11/2012 |
| WO | 02029717 A3 | 4/2002 |
| WO | 2003045244 A2 | 6/2003 |
| WO | 2005055496 A2 | 6/2005 |
| WO | 2007005976 A1 | 1/2007 |
| WO | 20071033379 A2 | 3/2007 |
| WO | 2008035271 A2 | 3/2008 |
| WO | 2010074986 A1 | 7/2010 |
| WO | 2010086374 A1 | 8/2010 |
| WO | 2012127353 A1 | 9/2012 |
| WO | 2012143290 A1 | 10/2012 |

OTHER PUBLICATIONS

Park, Hyungjun, and Kangsoo Kim. "Smooth surface approximation to serial cross-sections." Computer-Aided Design 28.12 (1996): 995-1005.

Goel, Vikash Ravi, Roy K. Greenberg, and Donald P. Greenberg. "Automated vascular geometric analysis of aortic aneurysms." IEEE computer graphics and applications 28.3 (2008).

Goel, Vikash Ravi, Roy K. Greenberg, and Donald P. Greenberg. "Mathematical analysis of DICOM CT datasets: Can endograft sizing be automated for complex anatomy?." Journal of vascular surgery 47.6 (2008): 1306-1312.

Saito, Toyofumi, and Jun-Ichiro Toriwaki. "New algorithms for euclidean distance transformation of an n-dimensional digitized picture with applications." Pattern recognition 27.11 (1994): 1551-1565.

Jones, Mark W., J. Andreas Baerentzen, and Milos Sramek. "3D distance fields: A survey of techniques and applications." IEEE Transactions on visualization and Computer Graphics 12.4 (2006): 581-599.

Hernandez-Hoyos, Marcela, et al. "Computer-assisted analysis of three-dimensional MR angiograms." RadioGraphics 22.2 (2002): 421-436.

Mourgues, Fabien, et al. "Interactive guidance by image overlay in robot assisted coronary artery bypass." International Conference on Medical Image Computing and Computer-Assisted Intervention. Springer, Berlin, Heidelberg, 2003.

Langs, Georg, et al. "Building and registering parameterized 3d models of vessel trees for visualization during intervention." Pattern Recognition, 2004. ICPR 2004. Proceedings of the 17th International Conference on. vol. 3. IEEE, 2004.

Pan, Mian, and Gisela Klette. A revision of a 3D skeletonization algorithm. CITR, The University of Auckland, New Zealand, 2004.

Siddiqi, Kaleem, et al. "Hamilton-jacobi skeletons." International Journal of Computer Vision 48.3 (2002): 215-231.

Weisstein, "Vector Derivative", Wolfram Mathworld 2010, Retrieved from the internet: URL:http://mathworld.wolfram.com/vectorderivative.html [retrieved on Oct. 25, 2010].

* cited by examiner

SEGMENTATION OF THREE-DIMENSIONAL IMAGES CONTAINING ANATOMIC STRUCTURES

CROSS-REFERENCE TO RELATED APPLICATION

This application claims the benefit of U.S. Provisional Patent Application No. 62/625,382, filed Feb. 2, 2018, and entitled SEGMENTATION OF TUBULAR STRUCTURES FROM MEDICAL IMAGE, and of U.S. Provisional Patent Application No. 62/625,377, filed Feb. 2, 2018, and entitled OSTIA PLACEMENT TOOL, each of which is incorporated herein by reference in its entirety.

TECHNICAL FIELD

This disclosure relates to segmentation of anatomic structures.

BACKGROUND

Segmentation is the process of partitioning an image into different meaningful segments. In medical imaging, these segments often correspond to different tissue classes, organs, pathologies, or other biologically relevant structures. Although there are many computer vision techniques for image segmentation, some have been adapted specifically for medical image computing. Some methods are interactive to enable clinicians to provide some input information, such as a seed region or rough outline of the region to segment. An algorithm can then iteratively refine such a segmentation, with or without guidance from the clinician.

SUMMARY

This disclosure relates to segmentation of anatomic structures.

As one example, a system includes a non-transitory computer-readable medium configured to store data and instructions and a processor configured to access the non-transitory computer-readable medium and execute the instructions. The instructions include vessel segmentation code programmed to segment at least one anatomic vessel structure from an image volume data and provide segmented vessel image data for the at least one anatomic vessel structure. The image volume data includes a three-dimensional medical image volume that includes the at least one anatomic vessel structure having a lumen extending therethrough. The vessel segmentation code includes seed generator code programmed to move a user-selected seed voxel to an adjusted seed voxel within an evaluation region of the image volume based on an evaluation of voxels within the evaluation region, the evaluation region including the user-selected seed voxel. The vessel segmentation code also includes region grow code programmed to fill a given region in the image volume with voxels to provide a segmented volume for the given region based on the adjusted seed voxel and segmentation parameters. The vessel segmentation code also includes fill evaluator code programmed to evaluate the segmented volume for given region and ascertain a quality of the fill. The seed generator code is further programmed to determine seed candidates for another region of the image volume from filled voxels adjacent a boundary of the given region in response to determining that the quality of the fill indicates a valid segmentation for the anatomic vessel structure in the given region.

As another example, a computer-implemented method includes displaying a medical image based on image volume data, the medical image including at least one anatomic vessel structure having a lumen. The method also includes selecting a user-selected seed voxel from the medical image in response to a user input. The method also includes shifting the user-selected seed voxel to an adjusted seed voxel in an evaluation region based on an evaluation of voxels within the evaluation region, the evaluation region including the user-selected seed voxel and at least one other voxel within a predetermined spatial distance from the user-selected seed voxel. The method also includes filling a given region in the image volume with voxels to provide a segmented volume for the given region based on the adjusted seed voxel and segmentation parameters. The method also includes evaluating a segmentation region to ascertain a quality of the fill, the segmentation region including filled voxels in the given region. The method also includes determining seed candidates for another region of the image volume from a set of the filled voxels adjacent a boundary of the given region in response to determining that the quality of the fill indicates a valid segmentation for the anatomic vessel structure in the given region. The method also includes storing segmented vessel image data for the at least one anatomic vessel structure isolated from the image volume.

DETAILED DESCRIPTION

Figure 1:
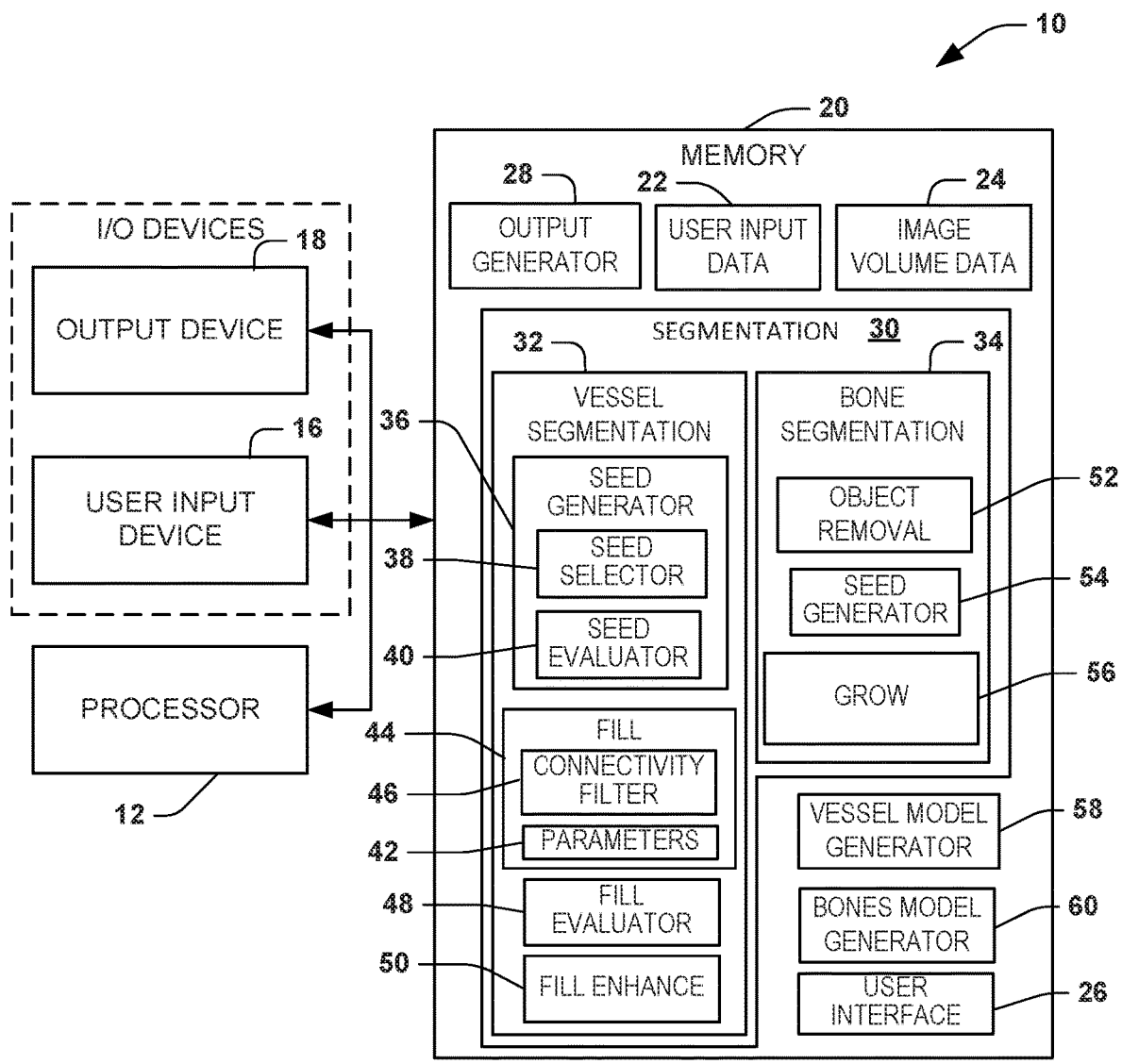
FIG. 1 is an example of a computer system programmed to segment an image.

This disclosure relates to segmentation of medical images. The segmentation can be applied to three dimensional image volume data acquired for a patient to isolate soft tissue (e.g., anatomical vessels, such as the aorta) as well as bone tissue. For example, the isolated vessels (e.g., a segmented image volume) can be processed to generate a three-dimensional vessel model, such as may be utilized as part of a visualization and intro-operative guidance system. The segmented vessel may be isolated and removed from the image volume for subsequent bone segmentation, which can be used to produce a model for the bones.

As an example, a segmentation method includes vessel segmentation that includes a seed generator programmed to generate an initial seed (e.g., a voxel) in response to a user input. The initial user-selected seed may be used to generate an evaluation region of voxels (e.g., a predetermined neighborhood of voxels around the user-selected seed) to identify an adjusted seed. A fill method uses the adjusted seed to fill a given region of the image volume with voxels to provide a segmented volume for the given region. For example, the image volume may be separated into a plurality of regions along a given direction to facilitate the segmentation process. The fill method may be applied to grow one of a plurality of regions or the entire image volume. Alternatively, the fill method may be applied to fill the whole image volume. In an example, the fill method may utilize a connectivity filter, such as to analyze statistically voxels within the given region with respect to the adjusted seed (e.g., within a confidence range) to identify voxels in given region that are sufficiently consistent with the adjusted seed voxel). Voxels that are determined to be sufficiently statistically similar are filled in the segmented volume and voxels inconsistent with the seed are excluded from the segmented volume.

The segmentation method can also be programmed to evaluate a fill condition of the segmented volume for the given region. As an example, the evaluation is programmed to determine whether there is an under fill condition, an over fill condition or whether the fill satisfies the fill criteria (e.g., a normal fill condition). If the fill evaluation determines there is over fill condition, the segmented volume for the respective region can be removed and a new user-selected seed can be entered (e.g., in response to a user input) for the respective region, and the segmentation fill process can be repeated based on the new user-selected seed. In an example, an adjusted see may be determined for the seed, as described herein. If the evaluation determines an under flow condition for the segmented volume for the given region, the segmentation can implement the fill enhancement method. The fill enhancement method can be programmed to remove bubble blobs (e.g., corresponding to unfilled voxels in the given region, such as due to discontinuities in voxel values of the vessel structure in the image volume) to increase the fill for the vessel in the given region. The segmentation can output segmented vessel image volume data that includes the voxels isolated by the segmentation method.

Systems and methods herein can be further proven to generate a model based on the segmented vessel. Because the segmented vessel exhibits improved isolation of anatomic vessel structure (e.g., with little or no discontinuities), the accuracy of the resulting vessel model is likewise improved. For example, the model can be an implicit model that includes a centerline model and a service model to describe the geometry of the vessel. Additionally, the segmented vessel image volume can be removed from the image volume to provide a subset of the image volume. In some examples, bone segmentation may be implemented on the remaining subset of the image volume, such as by implementing another instance of the seed generator and region grow method that are configured to segment bone tissue from the image volume, such as disclosed herein. A segmented bone image volume can then be provided and utilized to generate a corresponding model that may be utilized in conjunction with the vessel model, such as in an intra-operative guidance system.

FIG. 1 depicts an example of a computer system 10 programmed to perform segmentation of anatomic structures. The computer system 10 includes one or more processors 12 and associated memory 14. The memory 14 can include one or more non-transitory computer-readable media having instructions and data stored thereon. The memory 14 can include local storage with respect to the computer system 10 (e.g., physically attached to or in the same case as the processor 12) and/or it may be remote (e.g., network storage or in a cloud computing infrastructure). The system 10 also includes one or more input/output (I/O) devices demonstrated as including a user input device 16 and an output device 18. For example, the user input device 16 may include a keyboard, mouse, touch screen interface, gesture interface or the like that is configured to provide instructions and commands that can be stored in the memory 14 as user input data 22. The output device 18 can include one or more displays, such as a monitor, heads up display or virtual reality headset or goggles. In some examples, the user input device 16 and the output device 18 may be integrated (e.g., a touch screen or other display) to provide both inputs and outputs for the system 10.

As an example, the user input device 16 can provide the user input data 22 to specify a position (e.g., spatial coordinates) and/or movement of a pointer (e.g., a cursor) with respect to a graphical representation of the image volume data 24 displayed on the output device 18. Additionally or alternatively, the user input device 16 can be configured to provide the user input data 22 to select a particular voxel or pixel that is being displayed as part of the image on the output device 18. As another example, the user input device 16 may be used to activate a function presented at a given location (e.g., an area of the display 18).

The memory 20 may also store image volume data 24 (e.g., as a Digital Imaging and Communications in Medicine (DICOM) or other type of file). The image volume data 24 may include a three-dimensional medical image volume acquired preoperatively for a given patient by an image modality. As an example, the image volume data 24 corresponds to a preoperative arterial computed tomography (CT) scan for a region of interest of the patient, such as can be acquired the same day as or even days, weeks or months prior to a corresponding procedure (e.g., surgical intervention). Other medical imaging modalities can be used to provide three-dimensional image volume data 24, such as magnetic resonance imaging (MRI), ultrasonography, positron emission tomography (PET) or the like. The image volume data 24 thus can include image data representing voxels (three-dimensional image elements) corresponding to patient anatomy.

As mentioned, the memory 14 includes instructions that can be executed by the processor 12 to perform various functions disclosed herein. In the example of FIG. 1, the instructions include an output generator 28 programmed to generate an interactive output visualization that can be rendered based on the image volume data 24 as a graphical output and displayed on the output device 18. The output generator 28 can include one or more rendering methods and/or controls to control how the image is viewed (e.g., size, viewing angle and the like) in the output visualization that is displayed by the output device 18. The instructions stored in memory 20 can also include a user interface 26 to enable user interaction (e.g., through user input device 16) with the image and graphical user interfaces (GUIs) being displayed as well as various functions, including a segmentation method 30.

The segmentation method 30 is programmed to segment the image volume data, such as to isolate one or more blood vessels and/or bones. The segmentation method 30 includes a vessel segmentation method 32 and bone segmentation method 34. The vessel segmentation method 32 is programmed to isolate soft tissue from the image volume data 24, such as corresponding to one or more anatomic vessels. The vessel segmentation method 32 includes a seed generator 36 programmed to generate one or more seed voxels to control filling voxels in the image volume for isolating the one or more vessels. For example, the seed generator 36 includes a seed selector 38 that is programmed to select one or more seeds to be utilized to fill a given region of the image volume.

As an initial phase of the segmentation, for example, the seed selector 38 can utilize user input data 22 corresponding to a user selection of a voxel (or pixel) with the user input device from a visualization provided in the output device 18. In response to a user selecting a seed, a seed evaluator 40 is programmed to evaluate voxels within a predetermined distance from the user-selected seed voxel. As an example, the predetermined distance corresponds to an evaluation region of the image volume (e.g., a neighborhood) that includes a three-dimensional set of voxels (e.g., an N×N×N voxel matrix, where N>3, such as N≥7) that is centered about the user-selected voxel in three-dimensional image space. The seed evaluator 40 thus can evaluate each voxel in the evaluation region to identify an adjusted seed voxel based on evaluation criteria. For example, the seed evaluator 40 can identify a voxel in the evaluation region that has a highest voxel value. In the example of a CT image volume data 24, the voxel values may be provided in Hounsfield units; although different types of values may be used depending on the imaging modality used to provide the image volume data. The value associated with the seed voxel thus can define parameters to control volume fill that is performed by a fill method 44.

By way of example, the vessel segmentation method 32 includes the fill method 44 programmed to apply a connectivity filter 46 to fill a given region of the image volume with voxels based on the adjusted seed (e.g., provided by seed generator 36) and according to filter parameters 42. The parameters 42 can be determined to establish a confidence value range (or other statistics) based on the value adjusted voxel value. Thus, to fill a voxel in the given region, the value of such voxel must be within the confidence value range that defines the size of the confidence range. As an example, the confidence value range may be determined from a statistic distribution, mean and standard deviation of a seed's connected voxels (e.g., the confidence interval is the mean plus or minus the "Multiplier" times the standard deviation). For example, for an intensity distribution across a segment of Gaussian distribution, the confidence value range The size of the confidence interval is controlled by the "Multiplier" variable may be as follows:

$$u-2.5*\sigma <= \text{voxel's value} <= u+2.5*\sigma$$

where u is the mean value and σ is standard deviation would define confidence voxel candidates covering 99% of intensity values.

In this example, 2.5 is a multiplier value defined based on application requirements and may vary in other examples for different confidence ranges, which may be set by default or be user programmable.

Thus, in order for the region connectivity filter 46 to fill a given voxel in the volume, the given voxel needs to connect to the seed (e.g., the adjusted seed voxel) through a set of voxels (e.g., contiguous voxels) whose values are within confidence value range. For the example of three-dimensional isolation, connected voxels of a voxel may be defined by +1 −1 location relative to the central voxel in x, y, z directions. As one example, the maximum connected neighborhood voxel count is 3×3×3−1=26. In an example where the central voxel resides on the boundary of the volume (for the entire volume or the volume of a given region), the connected voxels count will be smaller than 26. After this initial segmentation is calculated, the mean and variance may be re-calculated. For example, the voxels in a previous segmentation may be used to calculate the mean the standard deviation (as opposed to using the voxels in the neighborhood of the seed voxel). The segmentation may then be recalculated using the refined estimates for the mean and variance of the voxel values. This process is repeated for the specified number of iterations. In this way, the fill method 44 can iteratively update mean and standard deviation by using newly isolated voxels to improve the fill results with more smooth isolation for the vessel that is being segmented. That is, all of the voxels, including the seed from a previous region can be used to calculate the mean and standard deviation for a next region.

Vessel segmentation method 32 can also include a fill evaluator 48 that is programmed to evaluate the segmented volume for a given region (e.g., generated by the fill method 44) and ascertain the quality of the fill (e.g., isolation) for the given region. For example, the fill evaluator 48 evaluates the quality of the fill, such as by determining a category for the fill. In one example, the fill evaluator 48 ascertains whether the fill for the given region is an over fill condition, an under fill condition or a normal fill condition. To ascertain the fill condition, for example, the fill evaluator 48 may evaluate one or more characteristics of the segmented volume for a given region.

By way of example, the evaluator 48 can determine a size of a boundary box (e.g., rectangular prism) that contains the segmented region, and evaluate the dimensions for the boundary box relative to a threshold as part of the quality of the fill. As another example, the fill evaluator 48 can evaluate a variance of the voxel values within the segmented volume. The fill evaluator 48 may also calculate a voxel density for voxels within the segmented volume of the given region relative to the total voxels for the volume of the given region. As yet another example, the fill evaluator 48 can determine a total number of voxels within the segmented volume. The fill evaluator 48 can other spatial dimensions associated with the segmented region to determine if an abnormal exception occurred during the fill process such that its spatial dimensions exceed a prescribed threshold.

The fill evaluator 48 can utilize one or more of such characteristics for the segmented region to ascertain the category of the fill. As an example, the fill evaluator can determine an overflow condition if one or more of the characteristics exceeds expected parameters. In response to determining over fill condition, the segmentation volume for the given region can be discarded and instructions provided to the seed generator 36 to obtain a new initial seed. Thus, in response to detecting the over fill, a user can be alerted (e.g., via text and/or graphics on the output device 18) that the fill failed. A new initial seed can be selected in response to a user input from the user input device. The user-selected seed may be for the same or a different region of the image volume. The seed generator 36 can in turn determine a new adjusted seed based on the user-selected seed, which than can in turn be utilized by the fill method 44 to fill the given region based on the new adjusted seed, as disclosed herein.

As a further example, in response to the fill evaluator 48 determining an under fill condition associated with the segmented region (e.g., based on one or more the characteristics), a fill enhance method 50 may be applied to a given region to enhance the internal structure of the segmented volume. The fill enhance method 50 can perform a multi-phase fill enhancement, such as by removing bubble blobs through a hybrid isolation method that includes threshold isolation and use of the connectivity filter 46.

An example of an algorithm that may be implemented by the fill enhance method 50 (e.g., a hybrid—two-phase) isolation algorithm of threshold isolation and the connectivity filter 46 is as follows:

1. Get isolation output image corresponding to the segmented volume for the given region (e.g., Phase 1 isolation).
2. Smooth the Phase 1 isolation output, such as by using a discrete Gaussian image filter.
3. Apply a multi-threshold image filter to provide uniformly segmented region, such as defined by an internal threshold.
4. Shift the seed according to a maximum voxel value for a set of neighboring voxels around the seed.
5. Evaluate to see whether fill enhancement is needed.
6. If fill enhancement is determined (e.g., by fill evaluator 48) to be needed, the multi-thresholded volume (from #3) is copied into the same volume inside the given region to be segmented and another instance of the connectivity filter 46 is applied to fill the given region to output a Phase 2 segmented volume for the given region (e.g., Phase 2 isolation).
7. The Phase 2 segmented volume (output by the connectivity filter 46) is then evaluated.

An example of program code corresponding to the fill enhance method 50, which may be programmed to implemented the fill enhancement, is as follows:

that the quality of the fill indicates a valid segmentation for the vessel structure in the given region, which may have involved enhancement or re-segmented such region, the seed selector 38 can be further programmed to select one or more seed candidates for the next region in the image volume. Alternatively, if the given region was the last (or only region) to be segmented, the segmented vessel image may be stored in the memory 20.

As a further example, the image volume may be spatially separated into a plurality of regions and the fill method 44 and fill evaluator 48 can be applied on a region-by-region basis so that the process of segmentation is applied separately each of the respective regions in the image volume. The separate segmented volumes for each of the regions can be aggregated to provide the segmented vessel image.

Based on a segmented volume for a given region being provided, for example, the seed generator 36 can generate a set of seed candidates at or near the boundary between the given current region and the next region in the image volume. The seed evaluator 40 can be programmed to evaluate the seed candidates and the seed selector 38 can select seed candidates for subsequent processing based on evaluation. For example, the seed evaluator 40 can evaluate the values of the seed candidates and/or determine that a threshold distance between the seed candidates is maintained to ensure an adequate distribution the seed candidates is achieved prior to the fill method 44 filling voxels in the next region of the image volume.

By way of example the seed generator 36 can employ the seed selector 38 and evaluator 40 to ensure that the candidate seeds are within a range of a mean seed value and the user manually picked seed value. An example of program code

```
typedef itk::DoubleThresholdImageFilter <InputImageType,InputImageType>
ThresholdImageFilterType;
ThresholdImageFilterType::Pointer thresholdFilter
= ThresholdImageFilterType::New( );
thresholdFilter->SetThreshold1    (threshHold[0]);
thresholdFilter->SetThreshold2    (threshHold[1]);
thresholdFilter->SetThreshold3    (threshHold[2]);
thresholdFilter->SetThreshold4    (threshHold[3]);
thresholdFilter->SetInput(precessedImg);
typedef itk::PasteImageFilter <InputImageType,InputImageType >
PasteImageFilterType;
PasteImageFilterType::Pointer pasteFilter= PasteImageFilterType::New ( );
OutputImageType::IndexType destinationIndex;
itk::ImageRegion<3> fullvolumeRegion(convertedITKVol-
>GetLargestPossibleRegion( ).GetIndex( ),convertedITKVol-
>GetLargestPossibleRegion( ).GetSize( ));
destinationIndex[0] = segmentedregion.GetIndex( )[0]-
fullvolumeRegion.GetIndex( )[0];
destinationIndex[1] = segmentedregion.GetIndex( )[1]-
fullvolumeRegion.GetIndex( )[1];
destinationIndex[2] = segmentedregion.GetIndex( )[2]-
fullvolumeRegion.GetIndex( )[2];
pasteFilter->SetSourceImage(thresholdedImage);
pasteFilter->SetDestinationImage(outItk_ROI);
pasteFilter->SetSourceRegion(thresholdedImage->GetLargestPossibleRegion( ));
pasteFilter->SetDestinationIndex(destinationIndex);
pasteFilter->Update( );
itkSmoothedFillPhase1=pasteFilter->GetOutput( );
itkFilter->SetInput(itkSmoothedFillPhase1);
itkFilter->Update( );
phase2Region=getSegmentedRegion(itkSegFinalOutput,regionSafe,phase2segme
ntedVoxNum,1);
```

The fill method 44 can thus provide the segmented volume (e.g., output from Phase 1 or Phase 2 of the connectivity filter 46) to the seed generator 36 for generating one or more seeds for use in growing a next region of the image volume. In response to the fill evaluator determining that may be implemented by the seed generator 36 relating the values of seed candidates, is as follows:

```
if(fabs((seedValue - m_seedMin0Max1Mean2Value[1]) /
m_seedMin0Max1Mean2Value[1]) <
filterParams->seedValueTolerance / 3||
fabs((seedValue -
filterParams->userDefinedSeedValueBeforeAndAfterShift[1]) /
filterParams->userDefinedSeedValueBeforeAndAfterShift[1]) <
filterParams-
>seedValueTolerance)
```

The seed evaluator 40 may also evaluate distance between seed candidates to ensure a sufficient distribution of seed candidates. For example, the seed evaluator 40 is programmed with a distance threshold to improve the spatial coverage of the seeds so isolation can represent a sufficient voxel value distribution. An example of program code that may be implemented by the seed generator 36 to provide a sufficient distribution of seed candidates, is as follows:

```
m_SegmenationFilterParams.seedSpacingFactor = qMax(10.0,30.0 -
m_seedExpandingMaximiumPhase);
double regionMinlength = std::min(std::min(size[0],size[1]),size[2]);
distanceThreshold = regionMinlength / filterParams->seedSpacingFactor;
```

For example, for a 512×256×128 volume the z axis of the image volume may be divided into 8 regions. In this example, a seed spacing factor may be set to:

seedSpacingFactor==$q$Max(10.0,30.0−8)=24 and a distance threshold may be set as follows:

distanceThreshold=128/24=5 voxels.

In this example, the distance between a current seed candidate and the previous seed needs to be at least 5 pixels to be considered as a new seed.

In some examples, seed candidates may be selected (e.g., by seed selector 38) and at the boundary of the given region (e.g., subregion). If the segmented voxels touch the ceiling of the sub-region, those voxels will be seed candidates of new seeds for next sub-region. In an example, the number of seeds selected from seed candidates for the next region can be set to not exceed a predetermined maximum number (e.g., 100 seeds). Thus, the seed selector 38 can choose up to the predetermined number of seeds among the seed candidates, and the selected seeds may be randomly spread sparsely among those seed candidates. If seeds are close to the boundary of the entire volume and the segmented region is small (i.e., meeting the condition of following code), the newly generated seeds may be ignored. An example of program code that may be implemented by the seed selector 38 for selecting seeds near or at a boundary of the current region, is as follows

```
if(size[0] < (unsigned int)abs(2 *
filterParams->regionGrowDirectionAndOffset[0]) || size[1] <
(unsigned int)abs(2 * filterParams->regionGrowDirectionAndOffset[1]) ||
size[2] < (unsigned
int)abs(2 * filterParams->regionGrowDirectionAndOffset[2]))
```

In response to the seed evaluator 40 identifying a sufficient number and distribution of seed voxels from among the seed candidates, the selected set of seeds can be stored in memory. The fill method 44 can utilize the seed candidates to fill voxels in the next region according to the application of the connectivity filter 46 and associated parameters 42, such as disclosed herein. The segmentation method 32 can be applied for each region of the image volume until the entire image volume has been segmented and connected together to provide an isolated anatomic volume image for the vessel in three-dimensional space, which isolated vessel volume image can be stored in the memory 20.

The bone segmentation method 34 can utilize the isolated vessel volume to facilitate the isolation of bone tissue from the original image volume data 24. For example, the bone segmentation method can remove the isolated vessel volume image from the image volume. Additionally, the bone segmentation method 34 may include an object removal function 52 to remove other objects unlikely to the bone from the image volume. The object removal function, for example, can be programmed to remove objects by smoothness, by thresholding and/or by volume size. After objects have been removed from the image volume, the bone segmentation method 34 may employ a seed generator 54 (e.g., another instance of seed generator 36) and a region grow method 56 (e.g., another instance of the fill method 44), which can be configured to function in a similar manner to that disclosed with respect to the vessel segmentation method. For example, the region grow method 56 can be programmed to utilize a threshold value based on a Hounsfield unit range expected for bone segments from the CT image volume data 24.

The system 10 can also include a vessel model generator 58 and a bones model generator 60. The vessel model generator can be programmed to generate an implicit model for the vessel based on isolated vessel volume image, such as disclosed herein (see, e.g., FIG. 2). The implicit model for the vessel structure may include a centerline model that describes geometry for each branch of the vessel as well as a surface model for the vessel structure. The surface model may describe geometry for an interior as well as an exterior surface of the vessel structure.

The bones model generator 60 can be programmed to generate the bones model to enable an overlay of the bones or a portion of the bones in response to a user input via user interface 26. In an example where the bones are to provide a further reference frame, which may be selectively added or removed from an output visualization (e.g., through user input device 16), the bones model generator 60 may generate the bones model as a three-dimensional model of points (e.g., pixels or voxels) corresponding to the isolated bone volume provided by the bone segmentation method 34. For example, the bones model generator 60 is programmed to generate the bones model by taking the voxel dataset (e.g., the output of the bone segmentation method 34) and applying a marching cubes algorithm to generate a mesh of polygons (e.g., triangles). The bones model may be stored in the memory 20. In some examples, the bones model and the vessel model (e.g., implicit centerline and surface models) are registered spatially, such as registered in the three-dimensional image frame of the image volume 24 or another reference coordinate system.

Figure 2:
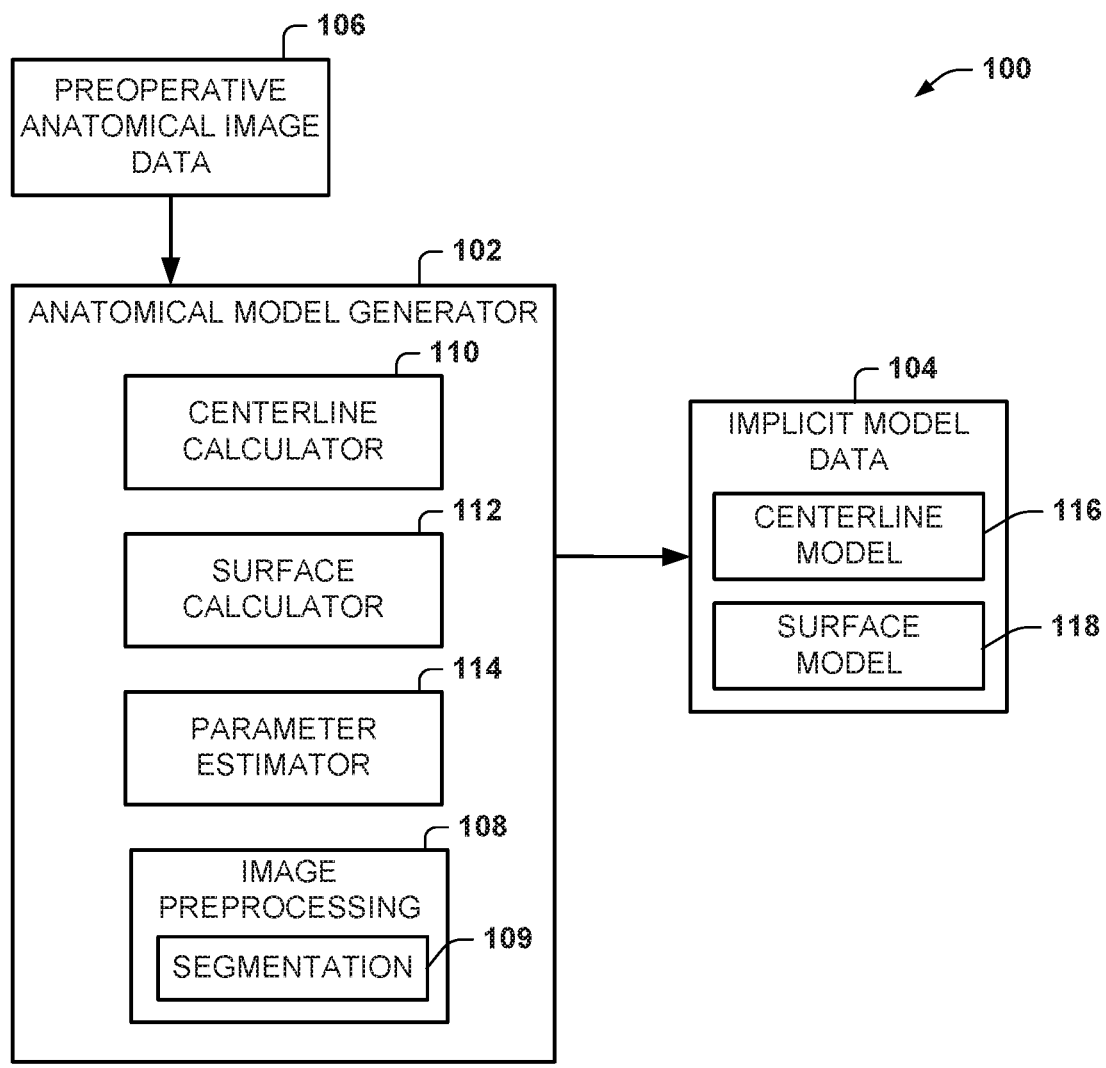
FIG. 2 depicts an example of a model generator configured to generate models based on a segmented image.

FIG. 2 depicts an example of a system 100 that can be utilized for generating an implicit model such as for a tubular anatomical structure. The system 100 includes an anatomical model generator 102 that is programmed to generate an implicit model data 104 based on anatomical image data 106. The anatomical image data 106, for example, can be acquired by preoperatively for a given patient by an image modality. As an example, the preoperative image data 106 can correspond to a preoperative arterial CT scan for a region of interest of the patient (e.g., corresponding to the image volume data 24 of FIG. 1). Other imaging modalities can be used as disclosed herein. Such scans are common part of preoperative planning in a surgical workflow to help size prostheses and to plan surgery or other interventions.

As an example, the image data 106 can include image data representing pixels (two-dimensional slices) or voxels (three-dimensional image elements) corresponding to patient anatomy. The image data 106 can also include one or more spatial transformations that can specify a translation of the pixels or voxels from an image space to a corresponding three-dimensional coordinate system. Such transformation can be provided as metadata, for example, as part of the image data 106. Thus the preoperative image data 106 contains information sufficient to convert coordinates of points (pixels) and/or volumes (voxels) of image data in the image space to the corresponding three-dimensional coordinate system corresponding to the imaging modality.

The anatomical model generator 102 is programmed to generate the implicit model data 104 based on processing the input image data 106. As an example, the anatomical model generator 102 can implement image pre-processing 108. The image preprocessing 108 can include automated and/or manual processes, such as to perform background correction. The image preprocessing 108 can also include a segmentation method 109 programmed to isolate an anatomic structure of interest from the image volume defined by the anatomical image data 106. The segmentation method 109 can correspond to the segmentation method 30 of FIG. 1, and thus can provide a segmented image volume for the one or more anatomical structure (e.g., segmented image volume for one or more vessels and another segmented image volume for bones), as disclosed herein.

For example, the anatomical structure being isolated can correspond to soft connective tissue, such as a major blood vessel as well as one or more branches that may extend from such vessel. As one example, the vessel can correspond to a patient's descending aorta and associated renal arteries as well as other branches thereof. In other examples, the anatomical structure can correspond to an intestinal tract, a portion of a respiratory tract, the patient's digestive tract or other anatomical structures that may be monitored or operated on for a variety of diagnostic and surgical purposes.

The model generator 102 can also include a centerline calculator 110. The centerline calculator can be programmed to compute a corresponding centerline for the elongated tubular anatomical structure based on the segmented image volume for the tubular anatomic lumen structure (e.g., vessel, such as the aorta). As one example, the centerline can be extracted from the segmented image volume as a pixel or voxel thickness extending longitudinally along the central axis of the structure. A corresponding surface boundary of the tubular structure can be computed by a lumen calculator 112. The tubular structure can correspond to a surface of the anatomical structure having a corresponding functional relationship relative to the centerline along the length of the structure as computed by the centerline calculator 110.

A parameter estimator 114 can compute a set of model parameters stored in memory as the implicit model data 104. For example, the parameter estimator 114 computes model parameters from the segmented vessel image volume describing geometry of the centerline to provide a centerline model 116. The parameter estimator also computes model parameters from the segmented vessel image volume to describing a surface of the lumen structure to provide the surface model 118. Each set of model parameters 116 and 118 can be a small set of parameters, such as geometric knots along the centerline, from which control points may be calculated. Additionally, the surface model corresponding to a lofted b-spline (basis spline) function for the elongated tubular structure.

As one example, the anatomical model generator 102 can be programmed to compute the implicit model data 104 according to the disclosure of U.S. Patent Publication No. 2011/0026793 entitled Automated Centerline Extraction Method and Generation of Corresponding Analytical Expression and Use Thereof, which is incorporated herein by reference. Another example of generating an implicit model for tubular anatomical structures is disclosed in *Analytical centerline extraction and surface fitting using CT scans for aortic aneurysm repair*, Goel, Vikash R, Master's Thesis, Cornell University (2005), which is incorporated herein by reference. Still another example of generating implicit models for a centerline and surface of tubular anatomical structures is described in the above-incorporated U.S. Provisional Patent Application No. 62/625377. Other approaches for generating the implicit model data can also be utilized, such as International Publication No. WO/2014/151651. Other types of geometric representations can also be utilized to provide the implicit model data 104. For example, parameters representing lofted ellipses or triangular meshes can be generated to provide the anatomical model data 104 representing the patient's anatomical structure of interest.

Figure 3:
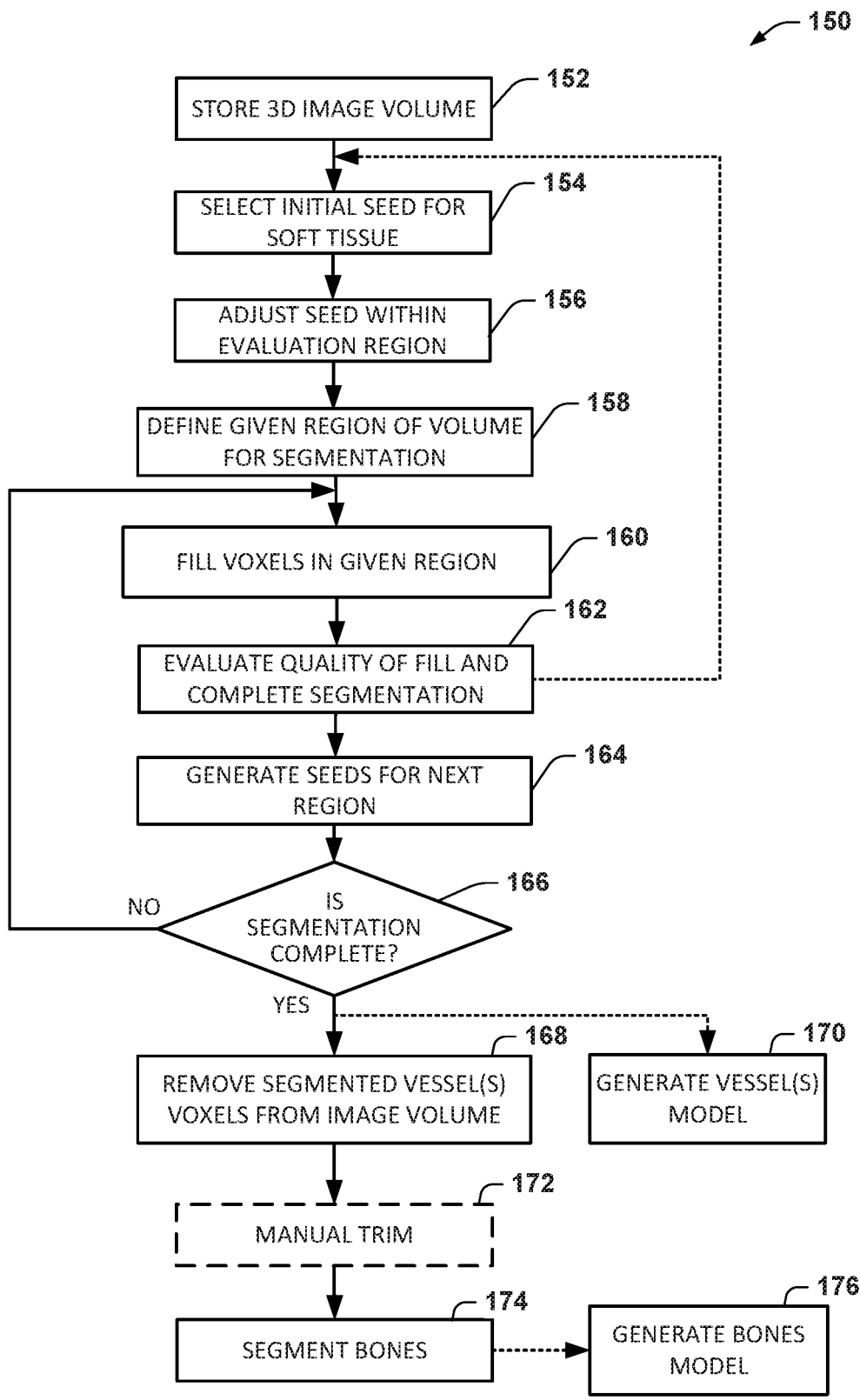
FIG. 3 is a flow diagram depicting an example of a segmentation method that can be applied to segment soft tissue and bones.

FIG. 3 depicts an example of a method 150 for segmenting an image volume such as may be performed by the system 10 of FIG. 1. The method 150 begins at 152 and which a three-dimensional image volume is stored (e.g., in memory 20). The representation of the image volume may be presented in an output display (e.g., output device 18) as pixels or voxels, for example. The display may include a user interface such as the pointer that can be positioned relative to the displayed image. At 154, an initial seed is selected for soft tissue in the image volume. For example, the user input device (e.g., device 16) may be used to position a pointer (e.g., curser) on the desired location of the soft tissue (e.g., a vessel wall) that is selected in the image volume in response to a user input. The selection of a pixel or voxel from the displayed image volume can provide an initial user-selected seed in the image volume. At 156, the seed can be adjusted within the evaluation region such as disclosed herein. Thus, the adjusted seed voxel may represent a high voxel value within a predetermined distance (e.g., voxel neighborhood) of the selected seed voxel. Data specifying the adjusted seed voxel may be stored in memory.

At 158, a given region of the image volume can be defined for segmentation. For example, the image volume may be separated into a plurality of similarly sized regions such as along a Z-axis of the three-dimensional image volume. The given region may be set as the region that contains the seed determined at 156. This determined region of the image volume can, in turn, be used for subsequent segmentation of such region, as disclosed herein.

At 160, voxels are filled within the given region to isolate the anatomic structure based on the seed provided at 156. For example, a connectivity filter (e.g., correspond to connectivity filter 46 of FIG. 1) can be applied to the given region and utilize associated parameters (e.g., fill parameters 42) to control the fill process. As an example, the parameters can include statistical parameters (e.g., mean and standard deviation) associated with the value of the seed voxel as well as for voxels being filled in the current given region.

At 162, the quality of the fill for the given region is evaluated and segmentation can be completed for the given region accordingly. For example, the quality of the given region can be determined to be one of an under fill condition, over fill condition or a normal fill condition. Steps can be taken to rectify the over fill and under fill conditions, such as disclosed herein. For example, in response to detecting an over fill condition, the current segmented volume for the given region can be reset back to the original (unfilled) volume and instructions provided to the user to return from 162 to 154 (shown by a dotted line) to select a new initial seed, which may reside in the same or different region of the image volume. The remaining part of the method 150 may proceed from 154 based on the new seed that is selected for the given region. In response to detecting an under fill condition at 162, the segmentation may be completed by performing fill enhancements such as disclosed herein (e.g., see FIG. 5B).

At 164, following completion of the segmentation for the given region of the volume, seeds for the next region are generated (e.g., by seed generator 36 of FIG. 1). At 166, a determination is made as to whether the segmentation for the image volume has completed. If the segmentation is not complete for the entire image volume, the method returns to 160. At 160 the connectivity filter is applied to fill voxels for the next region of the image volume based on the seeds generated at 164. The next region can be selected from the image volume according to the fill (grow) direction, which direction may be by default or user-selected (e.g., in response to a user input). The method can loop between 160 and 166 until the determination 166 indicates that the segmentation is complete for the image volume. Once the segmentation is complete at 166 the method can proceed to 170 to generate a vessel model based on the segmented isolated vessel volume (e.g., by model generator 58, 102).

Additionally after the vessel segmentation is determined to be complete at 166 the method may proceed to a bone segmentation method beginning at 168 (e.g., bone segmentation method 34). At 168, segmented vessel voxels can be removed from the image volume based on the isolated vessel image volume resulting from the completion of segmentation at 166. Additional objects may also be removed from the remaining image volume. This can include a manual trim of image objects at 172. Additionally or alternatively, objects may be removed from the image volume (provided at 152) in an automated manner based on thresholding or smoothness criteria that may be applied. At 174, the bones from the remaining image volume following removal of the segmented vessel volume and other objects. From 164, the resulting segmented bone volume may be utilized to generate a bones model at 176 (e.g., by model generator 60).

Figure 4:
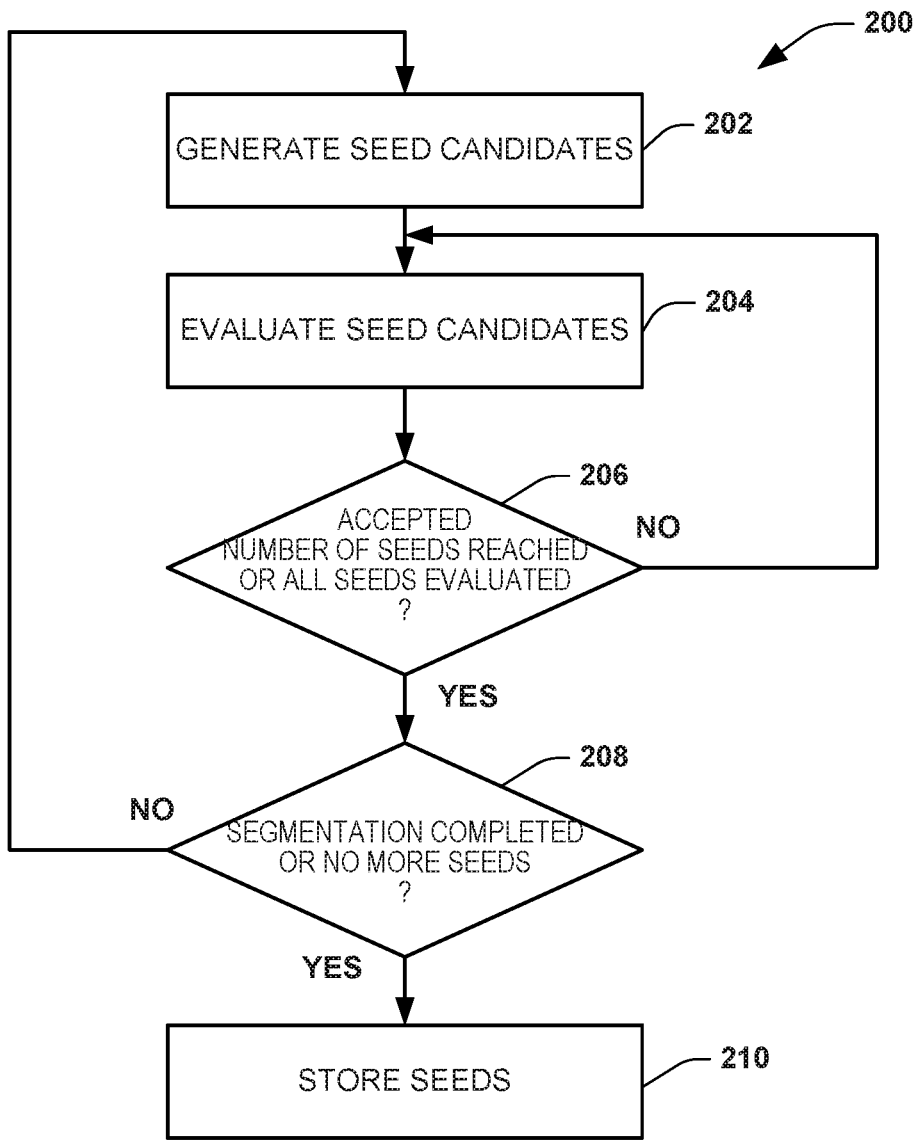
FIG. 4 is a flow diagram depicting an example method for generating seeds for segmentation.

FIG. 4 is a flow diagram depicting an example method 200 for generating seeds (e.g., automatically) for use in growing subsequent regions of an image volume as part of the segmentation process. The method 200 begins at 202 in which seed candidates are generated. The seed candidates can be generated on or near or a boundary of a region that is being filled in a given direction. The given direction for growing a given region can be set by default or assigned in response to a user input (e.g., via user input device 16).

At 204, the seed candidates are evaluated (e.g., by seed evaluator 40). For example, the seed candidates generated at 202 can be evaluated to ensure that predetermined seed criteria are met. For example, the evaluation at 204 can evaluate criteria such as based on the value of the voxels for the seeds, a spatial distribution or spread of the seeds, a direction of the seeds relative to the grow direction for the previous region and a volume of the seeds relative to the direction of growth. Further examples of such evaluation that may be performed at 204 are disclosed with respect to evaluator 40 of FIG. 1. The evaluation at 204 may be also utilized to update seed data that is stored in memory.

At 206, a determination is made as to whether an accepted number of seeds has been reached or if all seeds have been evaluated. If an insufficient number of seeds has been reached or all seed candidates have not yet been evaluated, the method may return to 204 to evaluate additional seed candidates. Once the accepted number of seed candidates have been obtained or all of the possible seed candidates have been evaluated, the method proceeds to 208. At 208, a determination is made as to whether the vessel segmentation process has been completed or the generation of seeds at 202 resulted in no acceptable seeds being generated. If the determination at 208 is negative (NO), the method returns to 202 to generate additional seed candidates for subsequent processing as disclosed herein. In response to determining that the vessel segmentation is complete (or no more seeds can be generated) the seeds generated for the given region are stored in memory at 210. For example, seed voxels stored for a given region thus can be used in a subsequent segmentation process, such as by application of a connectivity filter to fill voxels (e.g., 160 or by fill method 44) in a next region.

Figure 5A:
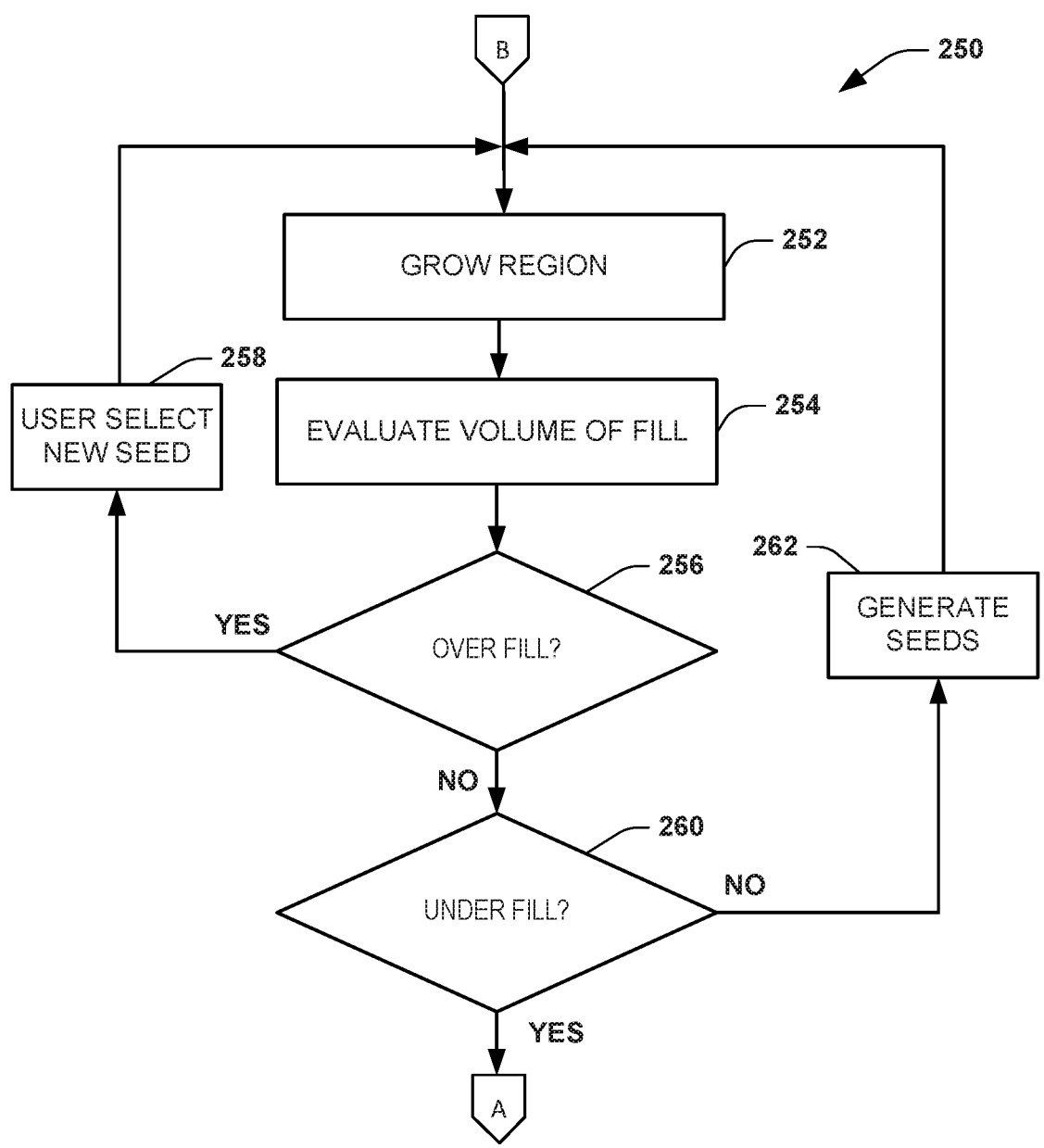
FIGS. 5A and 5B collectively provide a flow diagram depicting an example method for evaluating and enhancing fill for a given region during segmentation.
Figure 5B:
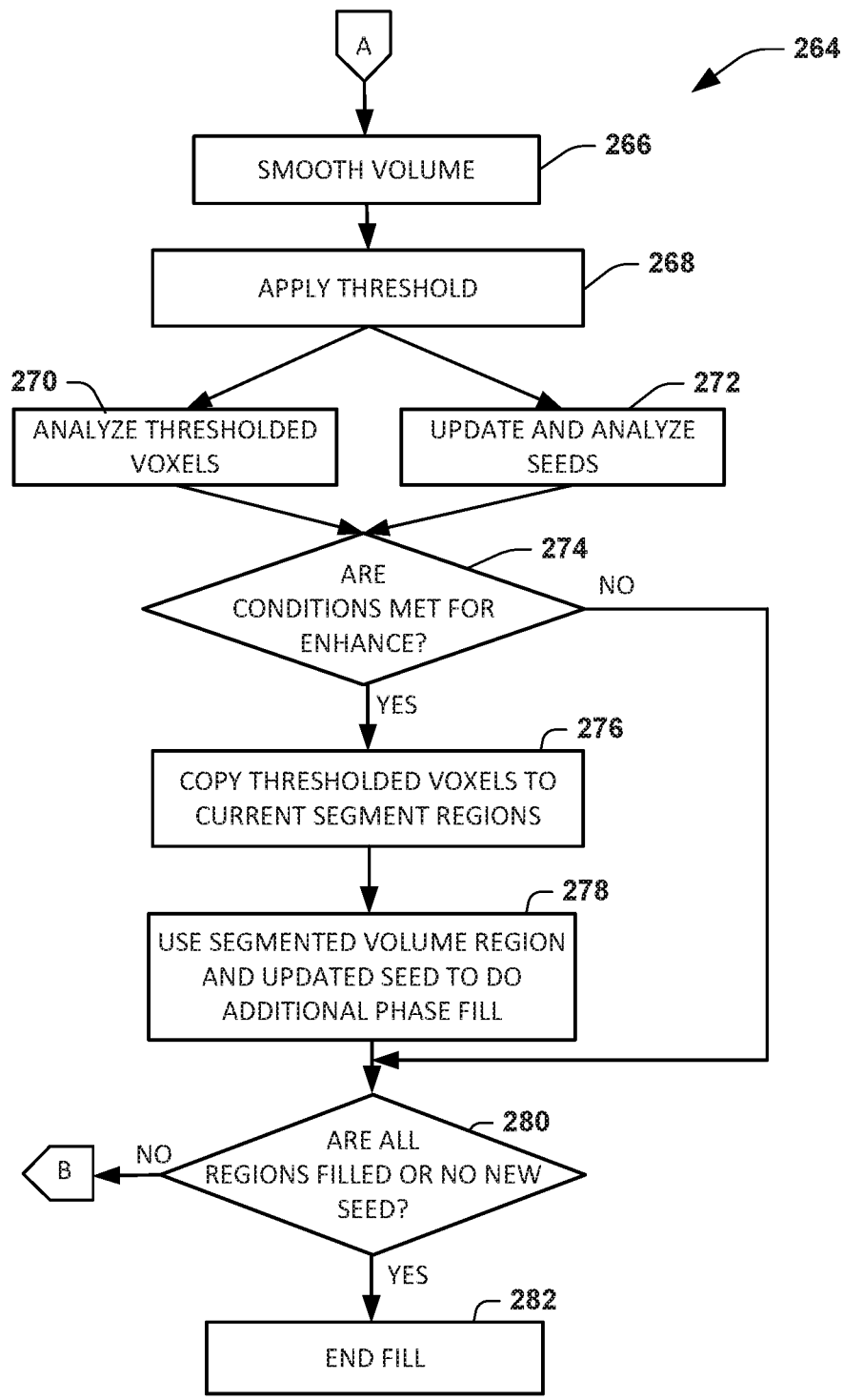

FIGS. 5A and 5B depict an example of fill evaluation and fill enhancement method 250 that can be utilized as part of a segmentation process (e.g., generally corresponding to 160 and 162 of FIG. 3). The method begins at 252 in which a new region is filled. The fill can be implemented to grow the given region through application of a connectivity filter, such as filter 46 demonstrated with respect to the fill method 44 of FIG. 1 or application of the connectivity filter at 160 of FIG. 3. For example, at 252, voxels are added to the segmentation volume for the given region according to filter parameters to provide a segmentation volume of voxels for the given region. In response to growing the region at 252, a resulting fill of the given region is evaluated at 254. For example, the evaluation of the volume of the fill at 254 can correspond to the functions performed by fill evaluator 48 of FIG. 1. For instance, the evaluation at 254 can evaluate spatial characteristics of the volume (e.g., size or dimensions) and/or other properties of the voxels in the given region.

Based on the evaluation at 254, the method proceeds to 256. At 256, a determination is made as to whether the fill at 252 resulted in an over fill condition. In response to detecting an over fill condition for the given region, the method proceeds from 256 to 258 in which a new seed is selected (e.g., in response to a user input). The new user-selected seed is utilized to drive a corresponding next fill process by growing the region at 252, such as disclosed herein. If there is no over fill determined at 256, the method proceeds to 258 to determine whether an under fill condition exists. If no under fill condition exists, it is considered a normal fill and the method can proceed to 262 to generate seeds from the segmentation volume for the given region to 252 (e.g., by seed generator 36). From 262, the method can return to 252 for filling a next region with a set of corresponding seeds that have been generated from the preceding region. For example the generation of seeds at 262 can correspond to the seed generation method 200 of FIG. 4.

If the under fill condition is determined to exist at 258 the method proceeds from 258 to 266 via connector "A" to perform a fill enhancement method 264 for the under filled region. At 266, the method includes smoothing the volume of the region. For example, the smoothing can be implemented by applying a Gaussian smoothing filter. From 266 the method proceeds to 268. At 268, thresholding is applied to the voxels in the under filled region. For example, the thresholding at 268 can employ multiple (e.g., two or more) thresholds to filter the smoothed image volume and provide a corresponding thresholded image volume for the given region. From 268 the method proceeds to both 270 and 272 for processing of thresholds applied at 268. At 270, the double thresholded voxels are analyzed. Additionally, at 272 the seed data for the given region are updated and analyzed. At 274 a determination is made as to whether the results of the analyses at 270 and 272 indicate that enhancement can be performed within expected parameters to improve the fill for the anatomic structure in the region being isolated. If the determination at 274 is affirmative, then the method proceeds to 276. At 276, the thresholded volume from the thresholding at 268 is copied into the current fill region. At 278, the subsequent phase of the region growth can be implemented (e.g., by a connectivity filter) based on the updated seed value that has been shifted or adjusted at 272. At 280 a determination is made as to whether the fill is complete for the current region or no new seed value exists for completing the fill. If the fill is not complete or additional seeds may be available, the method returns to 252 via connector "B" to fill the next region. Once the process is determined to be complete, the method can proceed to 282 and terminate, such as resulting in a segmented volume image being stored in memory. If the determination at 274 is negative indicating that conditions are unacceptable for fulfilling the enhanced fill, the method proceeds from 274 to 280 in which the enhanced fill process 276 to 278 is skipped. In one example, when fill enhancement cannot be performed to correct an under filled region, the segmented image volume for the given region (e.g., provided at 252) can be stored as the segmented volume image for such region and the method proceeds to 280.

Figure 6:
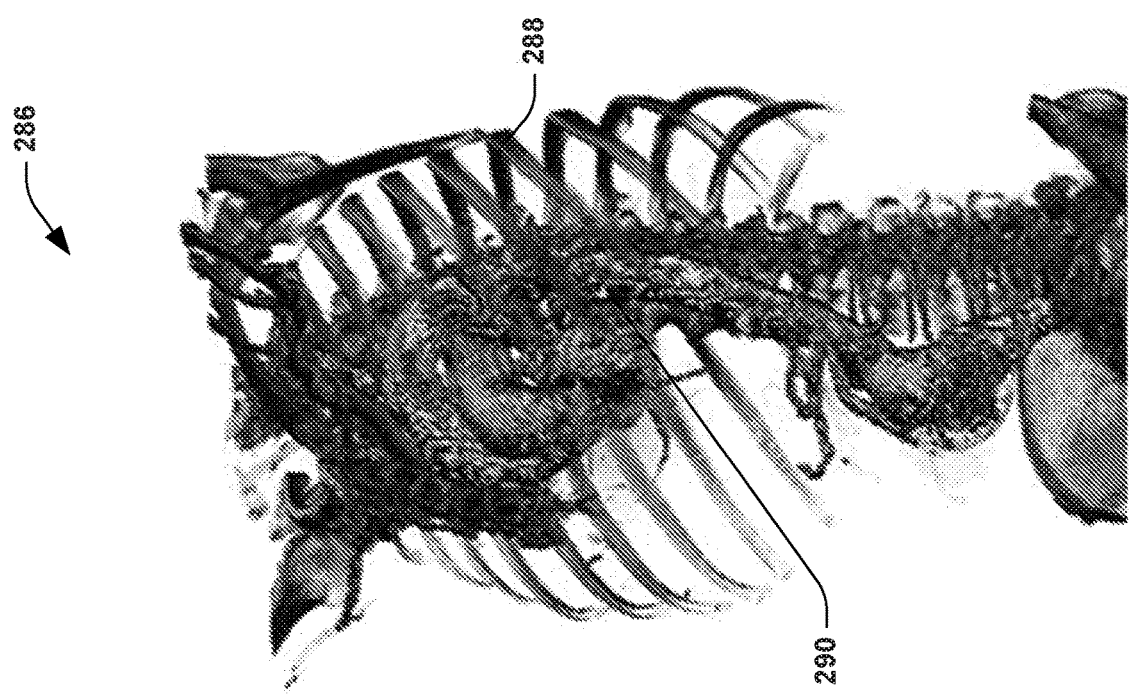
FIG. 6 depicts an example of isolated bone and vessels.

FIG. 6 depicts an example of a segmented image 286 that includes isolated bone 288 and isolated vessels 290, such as the descending aorta. For example, the segmented image can be rendered from separate image volumes for the segmented vessel 290 (e.g., generated by vessel segmentation 32) and the segmented bone 288 (e.g., generated by bone segmentation 34).

Figure 7:
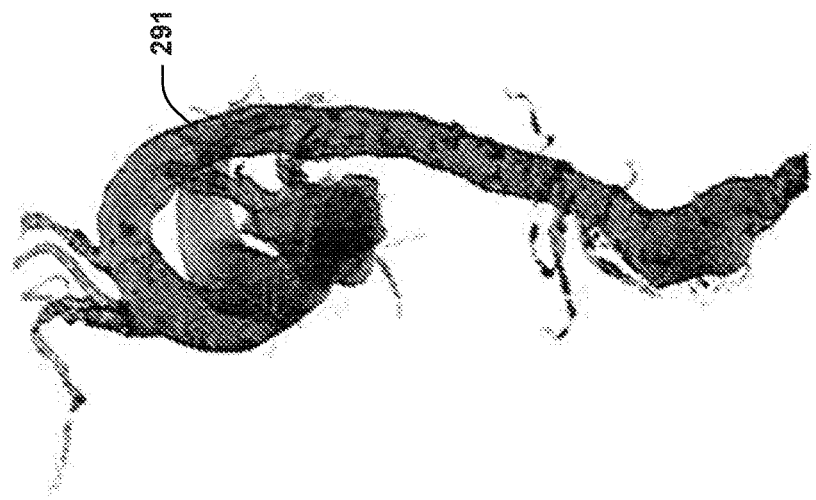
FIG. 7 depicts an example of a graphical representation of an isolated aorta.

FIG. 7 depicts an example of a graphical representation of an isolated aorta 291. For example, the image 291 can be rendered from a segmentation volume for the aorta (e.g., generated by vessel segmentation 32).

Figure 8A:
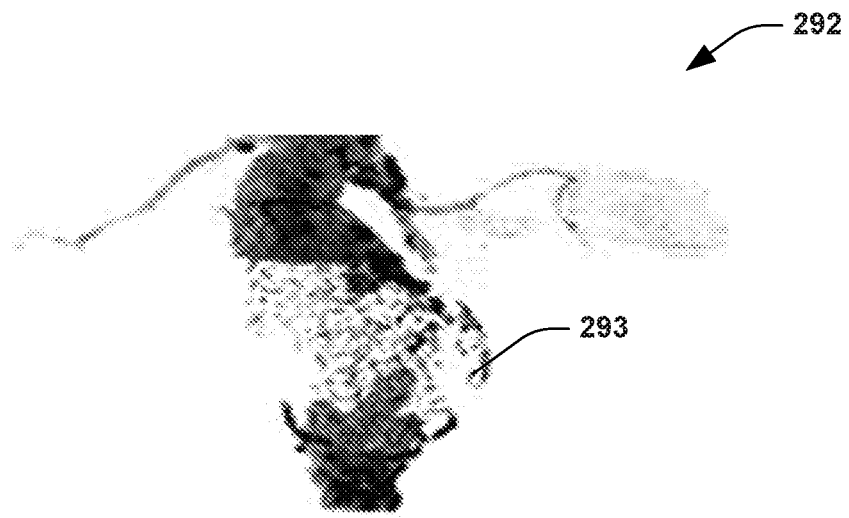
FIG. 8A depicts an example of an under filled image for a given region.
Figure 8B:
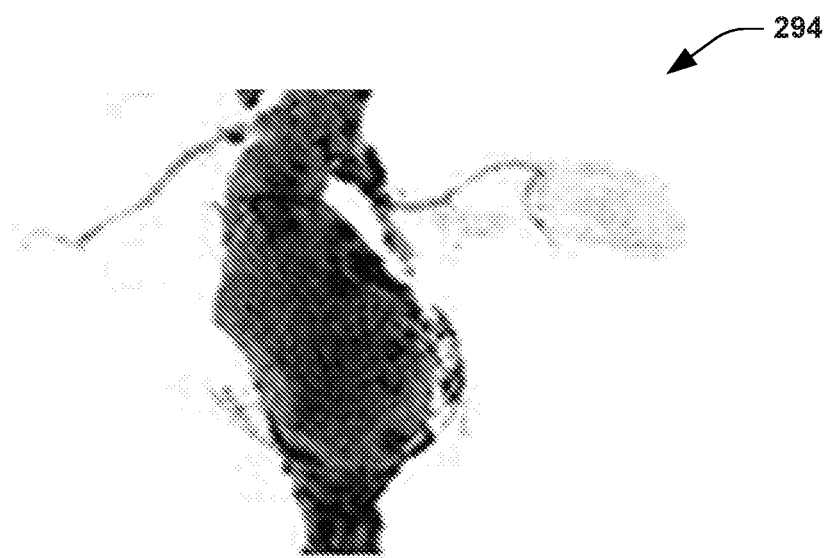
FIG. 8B depicts the given region of FIG. 8A after performing a fill enhancement.

FIG. 8A depicts an example of an image 292 for a given region of an image volume that includes an under filled subregion 293. For example, the image 292 can be generated by growing a given region as part of a region grow method (e.g., method 44, 250) based on one or more seeds, as disclosed herein. The under filled subregion can be detected (e.g., by fill evaluator (e.g., evaluator 48). In response to detecting the under fill subregion, fill enhancement may be performed on the given region (e.g., corresponding to fill enhancement 50, 264). FIG. 8B depicts an enhanced image 294 for segmented region of FIG. 8A after performing a fill enhancement.

Figure 9A:
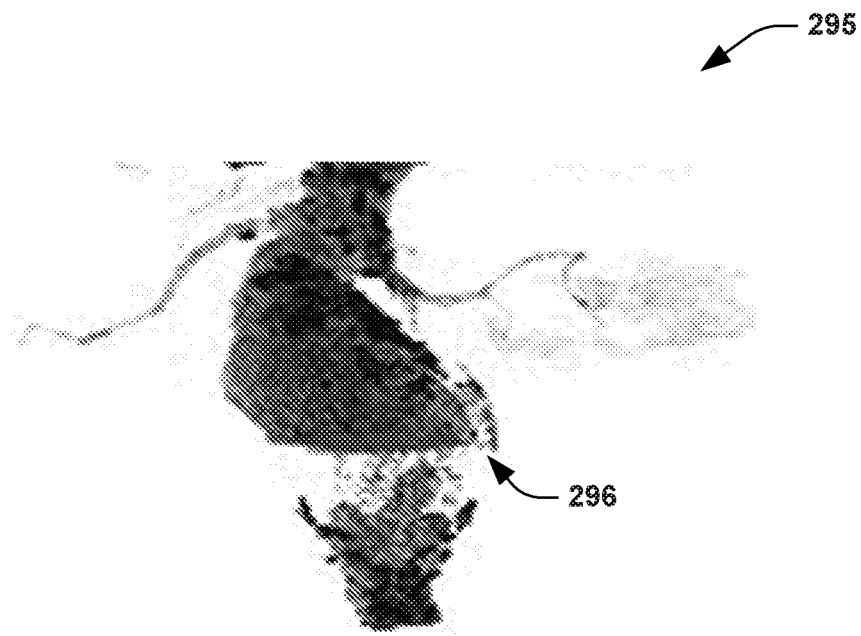
FIG. 9A is an example of part of an aorta depicting another region of exhibiting under fill for a given region.
Figure 9B:
FIG. 9B is an example of the portion of the vessel of FIG. 9B after performing fill enhancement.

FIG. 9A depicts an example of an image 295 for another region of an image volume that includes an under filled subregion 296. FIG. 9B depicts an enhanced image 298 for the under filled segmented image region 295 of FIG. 9A after performing a fill enhancement, as disclosed herein.

Figure 10:
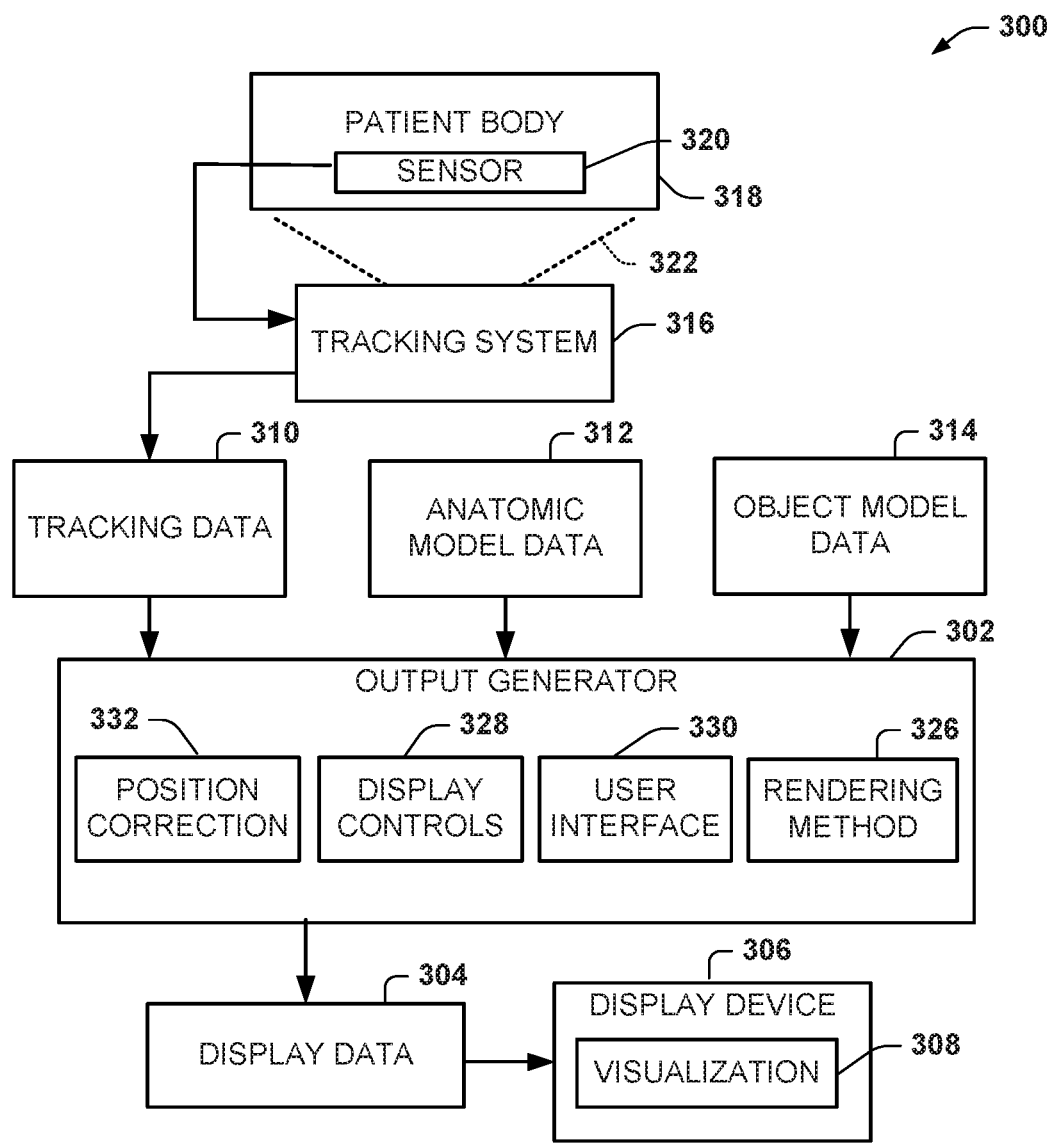
FIG. 10 depicts an example of an intra-operative guidance and visualization system to output a visualization.

FIG. 10 depicts an example of a system 300 configured to generate a visualization, such as to provide intra-operative guidance based anatomic model data 312, such as can be generated (e.g., by model generator 58, 60, 102) from one or more segmented image volumes, as disclosed herein. The system 300 includes an output generator 302 programmed to generate visualization data 304, which can be provided to a display device 306 to render a corresponding graphical representation. The output generator 302 can generate the visualization data 304 that is provided to a display device 306 for displaying a corresponding visualization 308. The visualization 308 can provide intra-operative guidance such as for surgical navigation. The output generator 302 can generate the visualization data 304 based on tracking data 310, anatomic model data 312 and object model data 314. The anatomic model data 312 can be a patient-specific implicit model that describes one or more anatomic structures in three-dimensional space (e.g., corresponding to the centerline and surface model data produced by model generator 58 of FIG. 1). As one example, the anatomic model data 312 can be generated from one or more segmented image volumes for an anatomic vessel structure (e.g., the aorta), such as may be isolated (e.g., by segmentation method 32, 150) from image volume data, as disclosed herein.

The object model data 314 can correspond to another three-dimensional implicit model that has been generated to describe geometry of an instrument (e.g., a catheter and/or guidewire) that is being inserted into the patient during a procedure.

The system 300 can include a tracking system 316 that includes one or more sensors 320 can be affixed to or integrated into the instrument to enable tracking of its location by the tracking system. The tracking system 316 is configured to generate the tracking data 310, which is registered in a common three-dimensional coordinate system with the anatomic model data 312 and the object model data 314 to enable real-time tracking of an instruments within the patient's body 318. The common coordinate system can represent a coordinate system for image data that has been acquired preoperatively relative to the tracking data that is generated intraoperatively by the tracking system 316. An example tracking system 316 and sensor 320 are commercially available from Northern Digital, Inc., of Ontario, Canada. The tracking system 154 can provide the tracking data with an output sample rate to enable computation of real time positioning and generation of the visualization 308 to include the object to which the sensor is attached. The tracking data 310 can be converted from a coordinate system of the tracking system 316 to a coordinate system that is common for the model data 312 and 314.

The output generator 302 includes a rendering method 326 programmed to produce a three-dimensional plot corresponding to the visualization data 304 based on the input data 310, 312 and 314. Various types of rendering software (e.g., commercially available or proprietary) can be utilized and implemented as the rendering method 326 and can vary according to the type of models generated for use by the system 300.

The output generator 302 can also include display controls 328 that can control the output that is provided intraoperatively. The display controls 328 can be configured to selectively generate any number of one or more displays concurrently on one or more display devices 306, each of which can include a different view of the object and the anatomic structure. The respective views can be selected automatically such as by default parameters or it can be adjusted in response to the user input just as can be provided a user interface 330. This display controls 328 can further control a viewing angle for each of the visualizations of the anatomic model and the object that are presented to the user. Since the structures in each visualization are virtual renderings based on implicit models, the output visualization is not constrained to any particular viewing angle or type of visualization.

As an example, the rendering method 326 can compute the centerline as a function of a single parameter (u) that goes from zero to one and varies along a path corresponding to the axis of the tubular structure taken by selecting a spacing of the parameter u. The rendering method 326 can also include a surface render function that can produce a plot for a surface of the anatomic structure based on the implicit surface model defined by the model data 308. As an example, the rendering method 326 can compute the surface as a function of two variables, such as the variable u, which extends along the centerline of the tubular structure and another parameter (v) which varies as one travels tangentially around the surface. As disclosed herein, the anatomic model data 312 can store the surface information as a series of slices in which each slice can be represented by a series of geometric knots of an elongated tubular structure. The surface render function can create vectors perpendicular to the tangent line of the control point at each geometric knot unit vectors, which vectors can have a radius corresponding to surface points defined by radius of the anatomic structure at such point. The surface render function can visualize the surface by evaluating the parameters to generate polygons (e.g., triangles) that tessellate the surface. Such polygons can be rendered efficiently with various computer graphics, hardware and software.

The rendering method 326 can also include an object render function to render a graphical representation of the object based on the object model data 314 and the tracking data 310, which is registered in a common coordinate system with the anatomic model data. The registered tracking data 310 represents a position and orientation of one or more sensors in three-dimensional space corresponding to the same coordinate system in which the anatomic model has been registered. The object render function can be programmed to generate a graphical representation for each object depending on the location of the object defined by the tracking data 310.

In view of the foregoing structural and functional description, those skilled in the art will appreciate that portions of the systems and method disclosed herein may be embodied as a method, data processing system, or computer program product such as a non-transitory computer readable medium. Accordingly, these portions of the approach disclosed herein may take the form of an entirely hardware embodiment, an entirely software embodiment (e.g., in one or more non-transitory machine-readable media), or an embodiment combining software and hardware. Furthermore, portions of the systems and method disclosed herein may be a computer program product on a computer-usable storage medium having computer readable program code on the medium. Any suitable computer-readable medium may be utilized including, but not limited to, static and dynamic storage devices, hard disks, optical storage devices, and magnetic storage devices.

Certain embodiments have also been described herein with reference to block illustrations of methods, systems, and computer program products. It will be understood that blocks of the illustrations, and combinations of blocks in the illustrations, can be implemented by computer-executable instructions. These computer-executable instructions may be provided to one or more processor of a general purpose computer, special purpose computer, or other programmable data processing apparatus (or a combination of devices and circuits) to produce a machine, such that the instructions, which execute via the processor, implement the functions specified in the block or blocks.

These computer-executable instructions may also be stored in computer-readable memory that can direct a computer or other programmable data processing apparatus to function in a particular manner, such that the instructions stored in the computer-readable memory result in an article of manufacture including instructions that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart block or blocks.

What have been described above are examples. It is, of course, not possible to describe every conceivable combination of components or methods, as further combinations and permutations are possible. Accordingly, the invention is intended to embrace all such alterations, modifications, and variations that fall within the scope of this application, including the appended claims. Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A system comprising:
   a non-transitory computer-readable medium configured to store data and instructions;
   a processor configured to access the non-transitory computer-readable medium and execute the instructions, the instructions comprising:
   vessel segmentation code programmed to segment at least one anatomic vessel structure from an image volume data and provide segmented vessel image data for the at least one anatomic vessel structure, the image volume data comprising a three-dimensional medical image volume that includes the at least one anatomic vessel structure having a lumen extending therethrough, the vessel segmentation code comprising:
   seed generator code programmed to move a user-selected seed voxel to an adjusted seed voxel within an evaluation region of the image volume based on an evaluation of voxels within the evaluation region, the evaluation region of the image volume including the user-selected seed voxel;
   region grow code programmed to fill a given region in the image volume with voxels to provide a segmented volume for the given region based on the adjusted seed voxel and segmentation parameters; and
   fill evaluator code programmed to evaluate the segmented volume for the given region and ascertain a quality of the fill of the given region, the quality of the fill indicating one of a valid segmentation, an over fill condition or an under fill condition, the seed generator code being further programmed to determine seed candidates for another region of the image volume from filled voxels adjacent a boundary of the given region in response to determining that the quality of the fill of the given region indicates the valid segmentation for the anatomic vessel structure in the given region.

2. The system of claim 1, wherein the user-selected seed includes a voxel selected from an image in response to a user input from a user device,
wherein the seed generator code further comprises seed evaluator code programmed to evaluate each voxel within a predetermined distance from the user-selected seed voxel, corresponding to the evaluation region, and to identify the adjusted seed voxel based on the evaluation.

3. The system of claim 2, wherein the seed generator code further comprises seed selected code programmed to shift from the user-selected seed voxel to the adjusted seed voxel in the evaluation region of the image volume according to which voxel in the evaluation region exhibits a highest voxel value based on the evaluation.

4. The system of claim 1, wherein the fill evaluator is programmed to evaluate one or more conditions of the image volume for the given region including a size of a bounding box for the given region, a variance of voxel values for the given region, a voxel density of the given region, a number of voxels in the given region and a dimension of the image volume that is occupied by voxels in the given region, the fill evaluator being programmed to specify the quality of the fill for the given region based on at least one of the conditions being satisfied.

5. The system of claim 4, wherein in response to determining that the quality of the fill indicates an over fill condition, segmented image data for the given region is discarded and another initial seed voxel is selected from the three-dimensional medical image volume in response to a user input, the segmented image data representing the segmented volume for the given region that is filled with voxels based on applying a connectivity filter, and
wherein the seed generator code is programmed to provide another adjusted seed voxel based on the other initial seed voxel that is selected, the region grow code being programmed to fill the given region based on the other adjusted seed voxel.

6. The system of claim 4, wherein in response to determining that the quality of the fill indicates an under fill condition for the segmented volume for the given region, the vessel segmentation code further comprises fill enhance code programmed to compensate for the under fill condition within the anatomic vessel structure in the given region.

7. The system of claim 6, wherein the fill enhance code is further programmed to smooth the segmented volume for the given region provided by the region grow code, apply thresholding within the segmented volume for the given region to provide thresholded image for the given region, copy the thresholded image into the given region and re-apply the region grow code to further segment the given region in the image volume based on a modified seed voxel.

8. The system of claim 1, wherein the given region is one of a plurality of regions in the image volume, the region grow code further programmed to control filling other regions in the image volume based on each of respective seed candidates from a preceding one of the plurality of regions, respective segmented volumes for each of the plurality of regions being aggregated to provide the segmented vessel image data for the at least one anatomic vessel structure.

9. The system of claim 1, wherein the seed generator code further comprises seed evaluator code programmed to evaluate the seed candidates for the other region of the image volume with respect to predetermined seed criteria to control the region grow code that is applied to fill the other region.

10. The system of claim 9, wherein the predetermined seed criteria comprise at least two of a value of the voxel, a spatial distribution among the seed candidates, a direction of growth for each seed candidate relative to the direction of growth for a previous seed, and a volume occupied by the seed candidates.

11. The system of claim 1, wherein the instructions further comprise bone segmentation code programmed to remove the segmented vessel image data from the image volume and to provide a remaining image volume, the bone segmentation code programmed to segment bone tissue from the remaining image volume.

12. The system of claim 11, wherein the bone segmentation code further comprises:
another instance of the seed generator code programmed to generate a seed for the bone segmentation code in response to a user input; and
another instance of the region grow code programmed to fill voxels within the bone tissue within the remaining image volume.

13. The system of claim 1, further comprising a model generator programmed to generate model data for geometry of the at least one anatomic vessel structure based on the segmented vessel image data.

14. The system of claim 13, wherein the model data comprises an implicit model that describes geometry of the at least one anatomic vessel structure, the implicit model including a centerline model and a surface model.

15. A computer-implemented method for segmenting an image volume comprising:
displaying a medical image based on image volume data, the medical image including at least one anatomic vessel structure having a lumen;
selecting a user-selected seed voxel from the medical image in response to a user input;
shifting the user-selected seed voxel to an adjusted seed voxel in an evaluation region based on an evaluation of voxels within the evaluation region, the evaluation region including the user-selected seed voxel and at least one other voxel within a predetermined spatial distance from the user-selected seed voxel;
filling at least a given region in the image volume with voxels to provide a segmented volume for the given region based on the adjusted seed voxel and segmentation parameters; and
evaluating a segmentation region to ascertain a quality of the fill of the given region, the quality of the fill indicating one of a valid segmentation, an over fill condition or an under fill condition, and the segmentation region including filled voxels in the given region based on the filling;
determining seed candidates for another region of the image volume from a set of the filled voxels adjacent a boundary of the given region in response to determining that the quality of the fill indicates the valid segmentation for the anatomic vessel structure in the given region; and
storing segmented vessel image data for the at least one anatomic vessel structure isolated from the image volume.

16. The method of claim 15, wherein shifting the user-selected seed voxel further comprises shifting from the user-selected seed voxel to the adjusted seed voxel based on determining which voxel in the evaluation region exhibits a highest value the determination.

17. The method of claim 15, wherein evaluating the segmentation region further comprises:
evaluating one or more conditions of the image volume for the given region, the one or more conditions including a size of a bounding box that contains the given region, a variance of voxel values for the given region, a voxel density of the given region, a number of voxels in the given region and a dimension of the image volume occupied by voxels in the given region; and
specifying the quality of the fill for the given region based the evaluation of the one or more conditions.

18. The method of claim 15, wherein in response to determining that the quality of the fill indicates an over fill condition, the method further comprises:
discarding segmented image data for the given region, the segmented image data representing the segmented volume for the given region that is filled with voxels based on filling;
selecting another initial seed voxel from the displayed image in response to a user input;
providing another adjusted seed based on the other initial seed voxel; and
filling another given region in the image volume with voxels based on the other adjusted seed voxel and according to segmentation filter parameters that are also based on the other adjusted seed voxel.

19. The method of claim 15, wherein in response to determining that the quality of the fill indicates an under fill condition, the method comprises performing a second phase of fill for the given region, the second phase of fill including smoothing the segmented volume for the given region, applying thresholding within the segmented volume for the given region to provide a thresholded image for the given region, copying the thresholded image into the given region and filling the given region by applying a connectivity filter to further segment the given region in the image volume.

20. The method of claim 15, further comprising evaluating the seed candidates for the other region with respect to predetermined seed criteria to control filling the other region with voxels,
wherein the predetermined seed criteria comprises at least two of a value of the voxel, a spatial distribution among the seed candidates, a direction of growth relative to the direction of growth for a previous seed, and a volume occupied by the seed candidates.

21. The method of claim 15, further comprising:
removing the segmented vessel image data from the image volume based on the segmented vessel image data to provide a remaining image volume; and
segmenting bone tissue from the remaining image volume.

22. The method of claim 15, further comprising generating a model of the at least one anatomic vessel structure based on the segmented vessel image data, wherein the model comprises an implicit model of the at least one anatomic vessel structure.

23. The system of claim 1, wherein, in response to determining that the quality of the fill for the given region indicates the over fill condition or the under fill condition, the vessel segmentation code is further programmed to rectify the respective over fill condition or under fill condition.

24. The system of claim 1, wherein the fill evaluator is programmed to determine that the quality of the fill indicates the overflow condition based on one or more characteristics of the segmented volume for the given region exceeding one or more of the segmentation parameters.

25. The method of claim 15, wherein, in response to determining that the quality of the fill for the given region indicates the over fill condition or the under fill condition, the method further comprises rectifying the respective over fill condition or under fill condition.

26. A system comprising:
a non-transitory computer-readable medium configured to store data and instructions;
a processor configured to access the non-transitory computer-readable medium and execute the instructions, the instructions programmed to perform a method comprising:
segmenting at least one anatomic vessel structure from an image volume data and provide segmented vessel image data for the at least one anatomic vessel structure, the image volume data comprising a three-dimensional medical image volume that includes the at least one anatomic vessel structure having a lumen extending therethrough, the segmenting comprising:
moving a user-selected seed voxel to an adjusted seed voxel within an evaluation region of the image volume based on an evaluation of voxels within the evaluation region, the evaluation region of the image volume including the user-selected seed voxel;
filling a given region in the image volume with voxels to provide a segmented volume for the given region based on the adjusted seed voxel and segmentation parameters; and
evaluating the segmented volume for the given region and ascertain a quality of the fill of the given region, the quality of the fill indicating one of a valid segmentation, an over fill condition or an under fill condition, and
determining seed candidates for another region of the image volume from filled voxels adjacent a boundary of the given region in response to determining that the quality of the fill of the given region indicates the valid segmentation for the anatomic vessel structure in the given region.

* * * * *